(12) United States Patent
Gaddam et al.

(10) Patent No.: US 9,178,659 B2
(45) Date of Patent: Nov. 3, 2015

(54) TECHNIQUES FOR ENCODING PLCP HEADERS

(75) Inventors: Vasanth Gaddam, Tarrytown, NY (US); Monisha Ghosh, Chappaqua, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1065 days.

(21) Appl. No.: 13/254,464

(22) PCT Filed: Feb. 25, 2010

(86) PCT No.: PCT/IB2010/050827
§ 371 (c)(1),
(2), (4) Date: Sep. 2, 2011

(87) PCT Pub. No.: WO2010/106454
PCT Pub. Date: Sep. 23, 2010

(65) Prior Publication Data
US 2011/0317722 A1    Dec. 29, 2011

Related U.S. Application Data

(60) Provisional application No. 61/161,586, filed on Mar. 19, 2009.

(51) Int. Cl.
*H04J 3/24*    (2006.01)
*H04L 1/00*    (2006.01)
*H04L 27/26*   (2006.01)

(52) U.S. Cl.
CPC ............ *H04L 1/0072* (2013.01); *H04L 1/0065* (2013.01); *H04L 1/0057* (2013.01); *H04L 27/2607* (2013.01)

(58) Field of Classification Search
CPC .. H04W 28/06; H04W 28/065; H04L 1/0072; H04L 1/0083; H04L 1/0057; H04L 27/2607
See application file for complete search history.

(56) References Cited

U.S. PATENT DOCUMENTS

| | | | |
|---|---|---|---|
| 2004/0179507 A1* | 9/2004 | Batra et al. ................. | 370/343 |
| 2005/0078598 A1* | 4/2005 | Batra et al. ................. | 370/206 |
| 2005/0135318 A1* | 6/2005 | Walton et al. ............... | 370/338 |
| 2005/0238016 A1* | 10/2005 | Nishibayashi et al. ....... | 370/389 |

(Continued)

FOREIGN PATENT DOCUMENTS

WO    WO2006025996 A2    3/2006

OTHER PUBLICATIONS

ECMA: "MAC and PHY for Operation in TV White Space" Standard ECMA-392, [Online], Dec. 1, 2009, pp. 1-182, XP002601029.

*Primary Examiner* — Hoang-Chuong Vu
(74) *Attorney, Agent, or Firm* — Larry Liberchuk (57) ABSTRACT

A method (400) and apparatus for encoding a block-based communication system header. A physical (PHY) layer header and a medium access control (MAC) header of the block-based communication system header are encoded to generate parity bits, wherein the PHY layer header includes at least cyclic prefix (CP) mode bits (S410). Parity bits are appended to the PHY layer header and the MAC layer header to generate a bit vector (S420). The bit vector is divided into at least two data blocks, wherein a first data block includes at least the CP mode bits (S430). A predefined number of tail bits are appended to each data block (S440). The two data blocks are mapped into at least two symbols, wherein the first data block is mapped to a first symbol, such that the first symbol is a first header symbol being transmitted (S450).

12 Claims, 5 Drawing Sheets

(56) References Cited

U.S. PATENT DOCUMENTS

| | | |
|---|---|---|
| 2006/0023802 A1* | 2/2006 | Balakrishnan et al. ....... 375/265 |
| 2007/0147228 A1* | 6/2007 | Kim et al. .................... 370/208 |
| 2009/0028220 A1* | 1/2009 | Roh et al. ..................... 375/136 |
| 2009/0041156 A1* | 2/2009 | Lakkis ......................... 375/300 |
| 2010/0054223 A1* | 3/2010 | Zhang et al. .................. 370/338 |
| 2010/0202493 A1* | 8/2010 | Soliman et al. ............... 375/130 |
| 2010/0226315 A1* | 9/2010 | Das et al. ..................... 370/328 |

* cited by examiner

TECHNIQUES FOR ENCODING PLCP HEADERS

This application claims the benefit of U.S. Provisional Application No. 61/161,586 filed on Mar. 19, 2009.

The invention relates generally to block based communication systems and, more particularly, to techniques for improving the throughput of such systems.

Block based communication systems traditionally have been used for wireless communications. Examples of such systems are an orthogonal frequency division multiplexing (OFDM) modulation system, a single carrier block transmission (SCBT) system, and the like. Block based communication systems are robust to multi-path interference and have a high frequency usage rate, thereby being highly efficient for wireless transmission.

Figure 1:
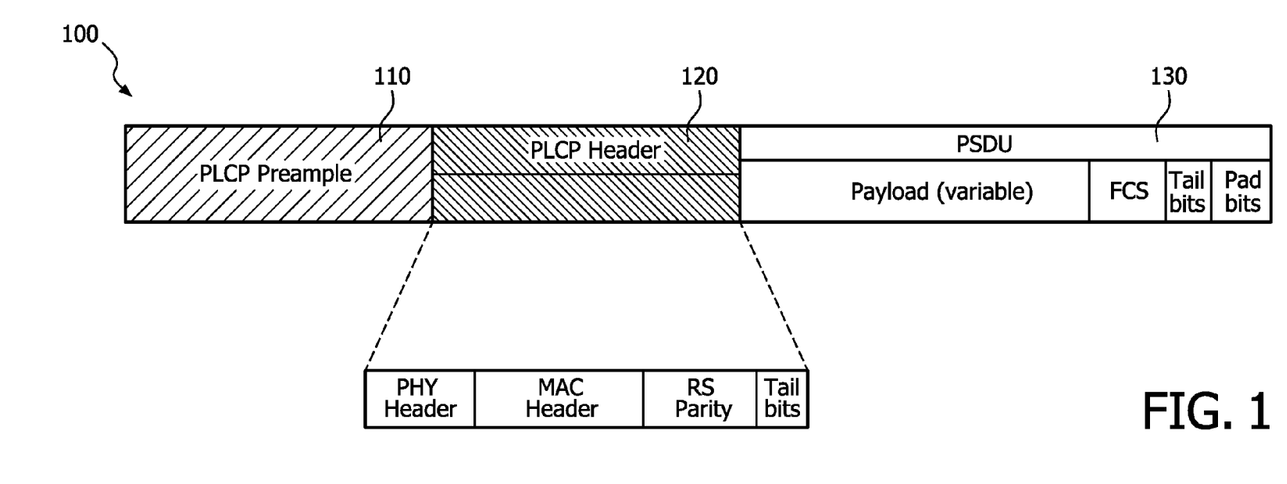
FIG. 1 is a diagram of an OFDM frame structure.

A signal transmitted by such systems is organized in frames, where each frame includes a variable number of symbols. FIG. 1 shows an exemplary frame structure 100 utilized, for example, in OFDM systems. The frame 100 includes a physical layer convergence protocol (PLCP) preamble 110, a PLCP header 120, and a PLCP service data unit (PSDU) 130. The PLCP preamble 110 carries information for performing initial acquisition, automatic gain control, timing and frequency synchronization, and for deriving an initial estimate of the channel impulse response.

The PLCP header 120 includes parameters that enable correct decoding of the PSDU 130 symbols. For example, these parameters include the payload length, the modulation and coding schema (MCS), and so on. The PLCP header 120 consists of a physical (PHY) layer header, a medium access control (MAC) layer header, a predefined number of parity bits for detecting and correcting errors in the PHY and MAC layer headers, and tail bits. The parity bits are generated by a Reed-Salomon (RS) encoder and are computed based on the contents of the PHY and MAC layer headers. In the receiver the entire PLCP header 120 should be decoded using a RS decoder. The PSDU 130 contains the payload data from a MAC layer. The PLCP preamble 110 and header 120 include a constant number of symbols.

Figure 2:
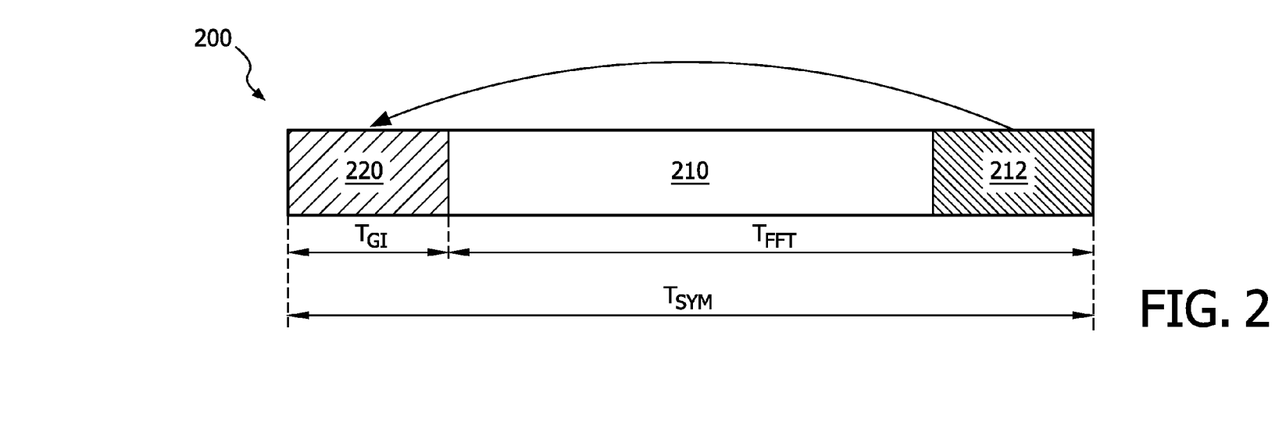
FIG. 2 is an illustration of a single OFDM symbol.

FIG. 2 shows an illustration of a single OFDM symbol 200 that includes two parts: a useful portion 210 which is a fast Fourier transform (FFT) window and a guard interval (GI) 220. A guard interval which is also referred to as a cyclic prefix (CP) is a repeat of the end of the symbol, i.e., the portion 212, at the beginning of the symbols. The time duration ($T_{FFT}$) of the useful portion 210 is larger than that of the time duration ($T_{GI}$) of the guard interval 220. The time duration of the symbol 200 is $T_{SYM}$.

The use of the guard interval 220 improves the system performance and simplifies the receiver implementation, but can result in inefficient bandwidth utilization. For example, if the length of the guard interval 220 is $N_{GI}$ samples, the bandwidth efficiency of the system is reduced by a factor of $N_{GI}/(N+N_{GI})$, where N is the number of samples (subcarriers) in a symbol. The guard interval time duration $T_{GI}$ is usually derived based on the worst case channel conditions, and thus may result in an inefficient use of the bandwidth. One approach for improving the bandwidth utilization is to dynamically adapt the guard interval time duration $T_{GI}$ based on the channel conditions.

Block based systems that use an adaptive guard interval include the cyclic prefix (CP) mode in the PLOP header 120 (and its PHY header). The CP mode is indicative of the guard interval time duration $T_{GI}$. In a conventional implementation, receivers process the symbols of the PLOP preamble 110 and header 120. Thereafter, symbols of the PSDU 130 can be demodulated and decoded. In some cases, the PLOP header 120 cannot be included in one symbol due to its limited length. For example, in a particular implementation of Cognitive Network Alliance (CogNeA) based systems defined in the ecma-392 standard, an OFDM symbol using the lowest MCS mode can carry 98 bits, while a typical PLOP header 120 includes 198 bits (40 PHY header bits, 80 MAC header bits, 64 RS parity bits, and 12 tail bits). In addition, block based receivers should know the guard interval time duration $T_{GI}$ to ideally determine the fast Fourier transform (FFT) window.

Figure 3:
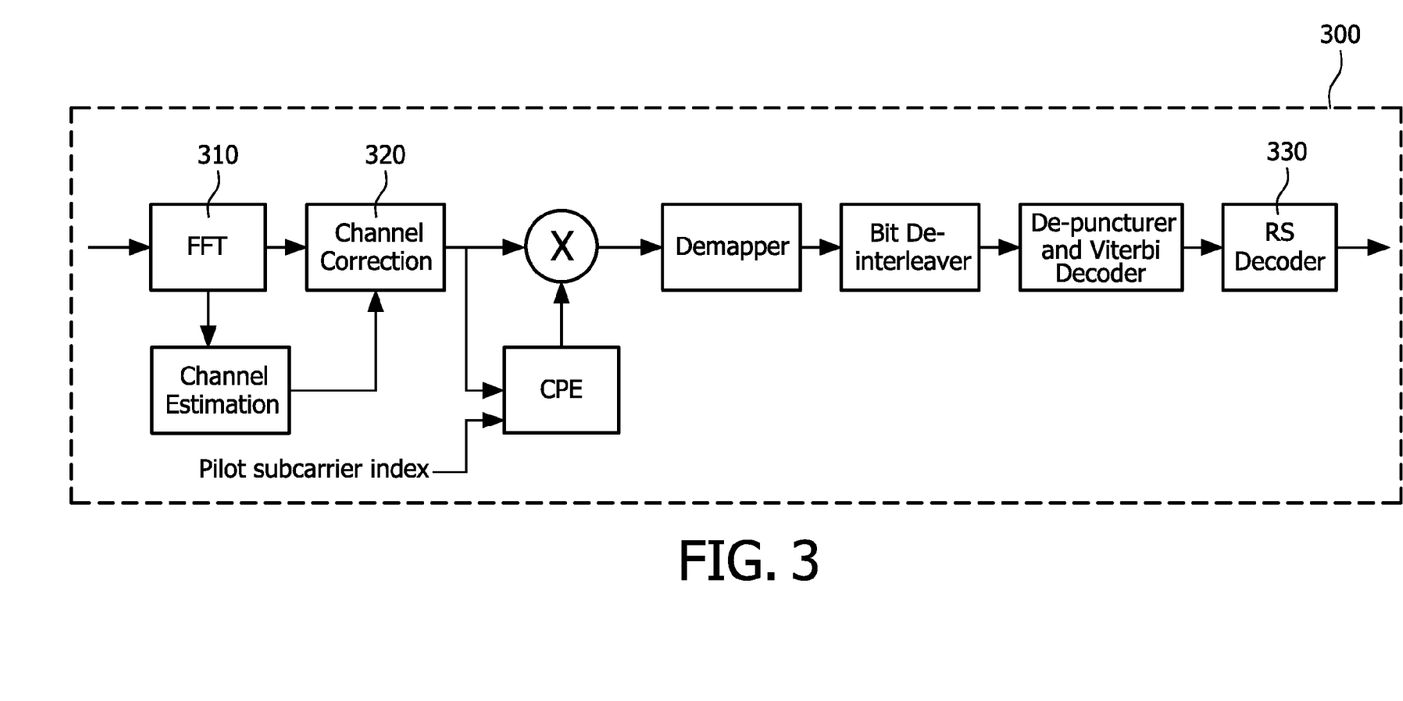
FIG. 3 is a block diagram of an OFDM receiver.

Typically, block based receivers, e.g., OFDM receivers, use pipelining to process the received symbols. This form of implementation reduces latency and further enables the receiver to send an acknowledgement (ACK) packet within the allocated time, e.g., a short inter-frame space (SIFS) window. FIG. 3 shows a schematic diagram of a conventional OFDM receiver 300. The pipeline processing implies that at a time of a block n, a FFT module 310 processes a $n^{th}$ block, a channel correction module 320 processes a $(n-1)^{th}$ block, and a RS decoder 330 decodes a $(n-2)^{th}$ block. When the CP mode information is transmitted in the PLOP header 120, the receiver 300 can determine this information only after the symbols of the PLOP header 120 are completely RS decoded. That is, only when the RS decoder 330 completes decoding the symbols that carry the PLOP header 120. This results in a snag in the pipeline process that induces significant latency. For example, while the PLOP header 120 is being decoded and the CP mode is not available, the receiver 300 cannot start processing the PSDU 130 symbols, as the guard interval time duration is not available. As a result, the overall throughput of the system is reduced.

It would be therefore advantageous to provide an efficient solution that improves the performance and throughput of block based communication systems.

Certain embodiments of the invention include a method for encoding a block-based communication system header. The method comprises encoding a physical (PHY) layer header and a medium access control (MAC) header of the block-based communication system header to generate parity bits, wherein the PHY layer header includes at least cyclic prefix (CP) mode bits; appending parity bits to the PHY layer header and the MAC layer header to generate a bit vector; dividing the bit vector into at least two data blocks, wherein a first data block includes at least the CP mode bits; appending a predefined number of tail bits to each data block; and mapping the at least two data blocks into at least two symbols, wherein the first data block is mapped to a first symbol, such that the first symbol is a first header symbol being transmitted.

Certain embodiments of the invention further include an apparatus for encoding a block-based communication system header. The apparatus comprises a block encoding unit for encoding cyclic prefix (CP) mode bits using a block code; a systematic Reed-Salomon (RS) encoder for encoding a physical (PHY) layer header and a medium access control (MAC) layer header to generate parity bits, wherein the PHY layer header includes at least the block coded CP mode bits; a vector splitter for dividing an output of the systematic RS encoder into at least two data blocks and appending a predefined number of tail bits to each data block, wherein a first data block includes at least the CP mode bits; and a mapper for mapping the at least two data blocks into at least two symbols, wherein the first data block is mapped to a first symbol, the first symbol is a first header symbol being transmitted.

Certain embodiments of the invention also include an apparatus for generating a physical layer convergence protocol (PLOP) header transmitted by a transmitter of a block-based communication system, wherein the PLOP header is transmitted in two symbols. The first transmitted symbol consists of a first half of the PLOP header and includes at least cyclic prefix (CP) mode bits and the second transmitted symbol consists of a second half of the PLOP header, wherein the CP mode bits are block coded and define the time duration of a guard interval.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with the principles of the invention a new PLOP header format is defined and encoded to enable a receiver to decode the CP mode information during the first header symbol. This allows the receiver to process a first payload symbol while the remaining header symbol(s) are being decoded.

Figure 4:
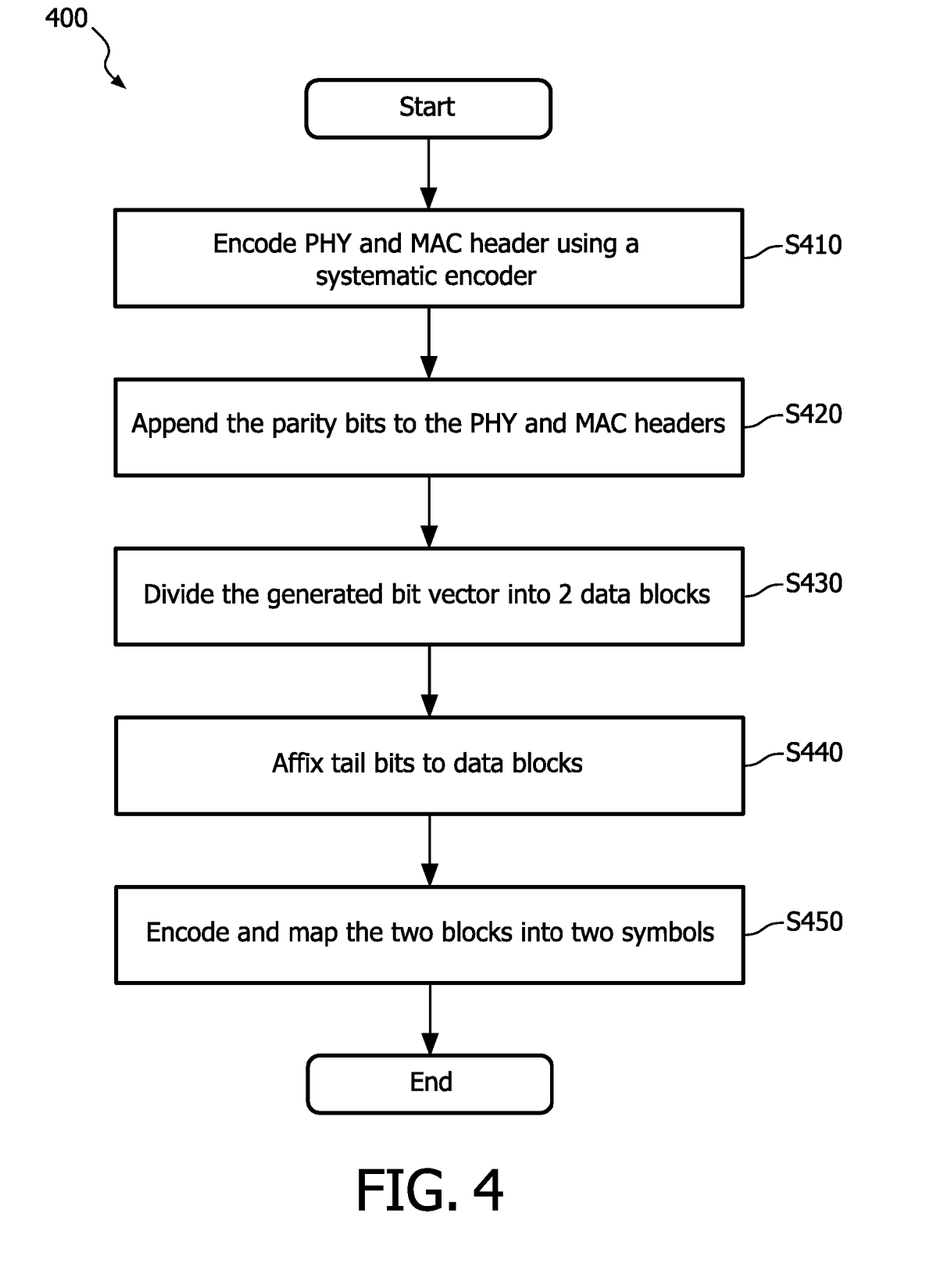
FIG. 4 is a flowchart for encoding a PLOP header in accordance with an embodiment of the invention.

FIG. 4 shows an exemplary and non-limiting flowchart 400 describing the process for encoding a PLOP header in accordance with an embodiment of the invention. At S410, the PHY and MAC headers of the PLOP header are encoded using a systematic RS encoder, which generates 'm' parity bytes (m is an integer number greater than 1). The PHY and MAC headers are not changed by the RS encoding. This allows deriving the guard interval duration without RS decoding at the receiver. It should be noted that in typical operating conditions and based on the fact that the header is transmitted in robust mode, the CP mode bits that convey the guard interval time duration are considered to be reliable. In certain embodiments of the invention a simple block code can be used to improve the reliability of the CP mode bits, ensuring that the overall reliability of these bits will be similar to the rest of the PLOP header bits. In addition, the CP mode bits are placed at the beginning of the PLOP header.

At S420, the 'm' parity bytes are appended to the PHY and MAC header bits to produce a bit vector having 'k' bits (k is an integer number greater than 1). At S430, the bit vector is equally divided into 2 data blocks, each of which includes the same number of bits.

At S440, a number of 't' tail bits (t is an integer number greater than 1) are affixed to each data block. The length of the resultant bit vector is 'k+2t' and the vector is designed to exactly fit into 2 symbols. At S450, each data block is independently encoded and mapped into two symbols, e.g., OFDM symbols. Specifically, when mapping the data blocks into the symbols, the CP mode (designed in the PHY layer header within the PLOP header) is included in the first symbol to be transmitted.

In a preferred embodiment of the invention the RS encoder generates 8 parity bytes (i.e., m=8), the number of tail bits is 6 (i.e., t=6) and the length of the bit vector including the tail bits is 196 bits. In addition, the bit vector may be encoded and mapped—using rate-1/2 convolutional encoding and quadrature phase-shift keying (QPSK) mapping—into 2 OFDM symbols, each having 98 bits.

Figure 5:
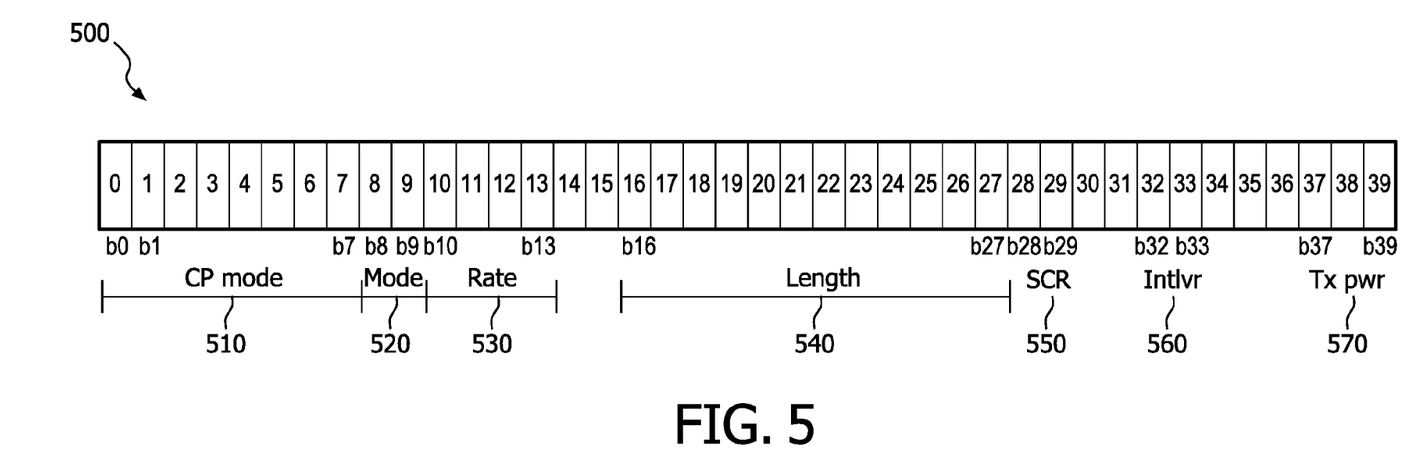
FIG. 5 is a non-limiting diagram illustrating a PHY header format constructed in accordance with an embodiment of the invention.

FIG. 5 shows a non-limiting diagram illustrating a PHY header format 500 constructed in accordance with an embodiment of the invention. The PHY header 500 is part of the PLOP header and includes at least parameters allowing the decoding of PSDU symbols. Specifically, the PHY header 500 comprises a CP mode field 510 (bits b0-b7) defining the guard interval duration, the transmission mode field 520 (bits b8 and b9), bits b10 through b13 are of a data rate field 530. The length field 540 defining the length of the payload data is placed in bits b16 through b27, bits b28 and b29 specify an initialization seed (SCR) field 550, an interleaver option 560 is designated in bits b32 and b33, and the transmit power field 570 is in bits b37 through b39. The PHY header 500 also includes a number of reserved bits located in positions b14, b15, b30, b31 and b34-b36.

In an embodiment of the invention a repetition code is used to encode the bits of the CP mode field 510. According to this embodiment, the first two bits of the CP mode field 510 (bits b0 and b1) determine the guard interval duration, where the mapping between the bits' values to the duration is predefined. An example of such a mapping is provided in Table 1. The remaining CP mode bits (bits b2-b7) are a repetition of bits b0 and b1. That is, bits b2, b4 and b6 are a copy of the bit in position 0, while the bits b3, b5 and b7 are a copy of bit b1.

TABLE 1

| CP Mode bits C1-C0 | GI Duration |
|---|---|
| 00 | $T_{FFT}/16$ |
| 01 | $T_{FFT}/8$ |
| 10 | Not used |
| 11 | $T_{FFT}/32$ |

Figure 6:
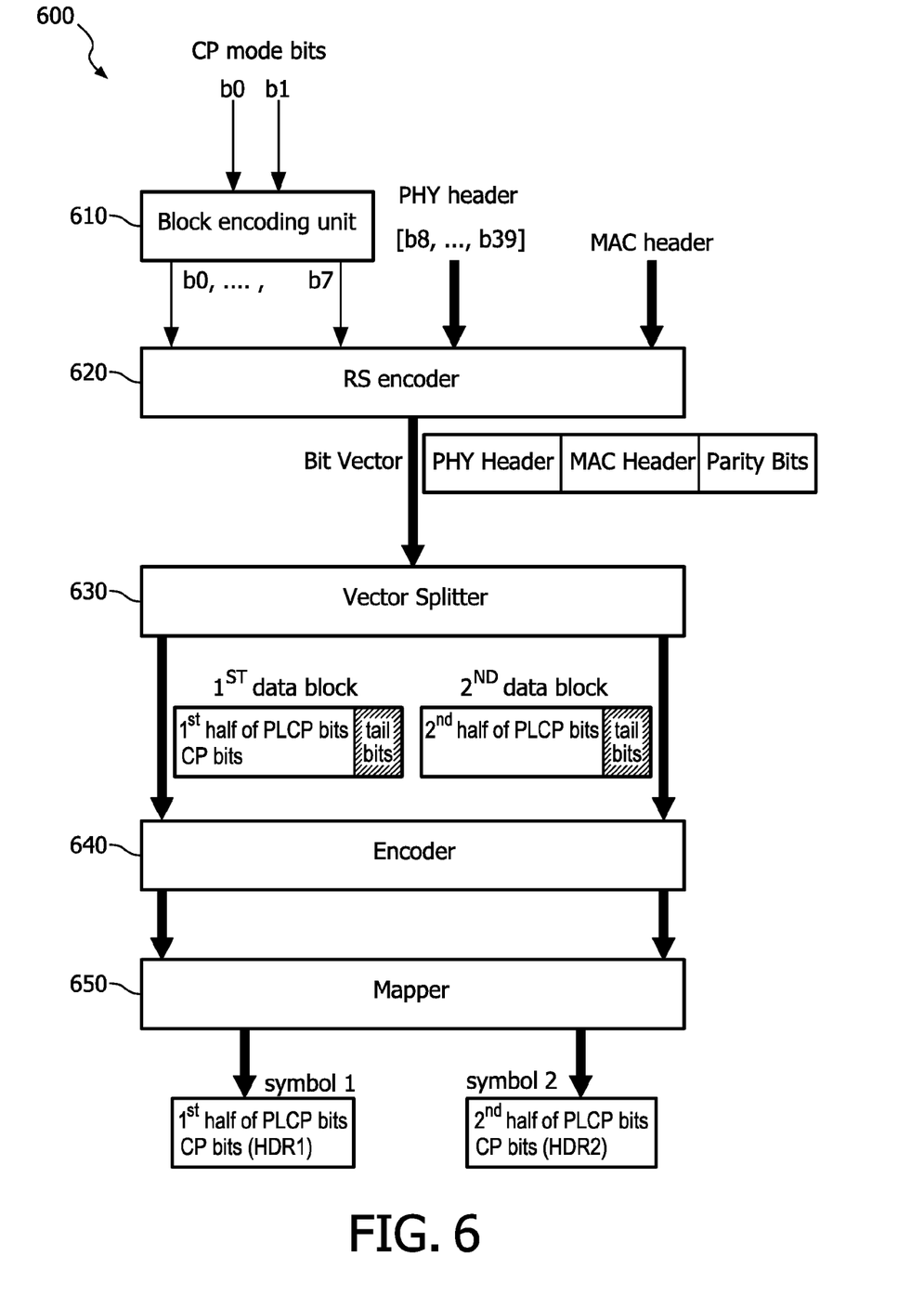
FIG. 6 is a block diagram of an apparatus in accordance with an embodiment of the invention.

FIG. 6 shows a non-limiting diagram of an apparatus 600 in accordance with an embodiment of the invention. The apparatus 600 is designed to allow encoding of a PLOP header in such way that reliable CP mode bits are available even before performing RS decoding in the receiver, thereby allowing the receiver to derive the guard interval duration after processing a first received header symbol. The apparatus 600 comprises a block encoding unit 610, a systematic RS encoder 620, a vector splitter 630, an encoder 640, and a mapper 650.

The block encoding unit 610 receives T bits of the CP mode (e.g., b0 and b1 of the PHY header 500) and outputs 'g' bits where the last 'g-j' bits (e.g., b2-b7 of the PHY header 500) are a repetition of the CP mode bits. The output of the block encoding unit 610 is inserted into the PHY header. The parameters T and 'g' are integer numbers greater than 1. It should be noted that the block encoding unit 610 uses a repetition code to encode the CP mode bits. This is only one example for a code that can be utilized. Other possible codes for coding the CP mode bits will be apparent to one of ordinary skill in the art.

The systematic RS encoder 620 encodes the PHY and MAC headers of a PLOP header. In a systematic RS code, the codeword includes the original message bytes, usually at a fixed location. Therefore, at the receiver it is possible to access the message bytes without executing RS decoding process. A person with ordinary skill in the art will be familiar with the RS encoding and decoding processes. The output of the RS encoder 620 is 'm' parity bits that are being appended to the PHY and MAC headers.

The vector splitter 630 equally divides the input bit vector including the PHY and MAC headers, as well as the parity bits, into two data blocks (BLK1 and BLK2). The vector splitter 630 also appends 't' tail bits to each data block. The encoder 640 encodes the blocks generated by the vector splitter 630, and the encoded data blocks are then mapped into 2 data symbols (e.g., OFDM symbols) by the mapper 650. The encoder 640 can use an error correction code, such as a rate-1/2 convolutional code, a turbo code, a low-density parity-check (LDPC), and the like. The encoder 640 further modulates the data blocks to constellation points by using any constellation based scheme. The mapper 650 assigns the constellation points to sub-carriers in an OFDM symbol.

Various embodiments of the invention can be used with any packet based communications systems using OFDM like modulation schemes. In particular, teachings disclosed herein can be used with systems that use adaptive guard interval duration and more than one OFDM symbol to transmit the PLOP header bits. For example, the teachings of the invention can be efficiently implemented in CogNeA based systems that utilize the ecma-392 standard and the like.

The principles of the invention can be implemented as hardware, firmware, software or any combination thereof. Moreover, the software is preferably implemented as an application program tangibly embodied on a program storage unit, computer readable medium, or machine readable medium. One of ordinary skilled in the art would recognize that a "machine readable medium" and/or "computer readable medium" is a medium capable of storing data and can be in a form of a digital circuit, an analogy circuit, magnetic media or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for encoding a block-based communication system header, comprising:
    encoding a physical (PHY) layer header and a medium access control (MAC) header of the block-based communication system header to generate parity bits by using a systematic error correcting code, wherein the PHY layer header includes at least cyclic prefix (CP) mode bits, wherein said CP mode bits define a time duration of a guard interval;
    appending the parity bits to the PHY layer header and the MAC layer header to generate a bit vector;
    dividing the bit vector equally into first and second data blocks, wherein the first data block includes at least the CP mode bits;
    appending a predefined number of tail bits to each data block of the first and second data blocks; and
    mapping the first and second data blocks into at least two symbols, wherein the first data block is mapped to a first symbol, and wherein the first symbol is to be transmitted before the second symbol.

2. The method of claim 1, wherein the block-based communication system header is at least a physical layer convergence protocol (PLCP) header.

3. The method of claim 1, wherein the encoding is a systematic Reed-Solomon (RS) encoding.

4. The method of claim 1, wherein the CP mode bits are the first bits in the PHY layer header.

5. The method of claim 4, further comprising deriving, at a receiver, the time duration of the guard interval directly from the first header block without performing RS decoding on the first header block.

6. The method of claim 4, further comprising encoding the CP mode bits using a block code prior to the encoding of the headers.

7. The method of claim 1, further comprising encoding the first and second data blocks using at least a rate-1/2 convolutional code prior to said mapping.

8. The method of claim 7, wherein the encoding of said first and second data blocks further comprises modulating the data blocks to constellation points using a constellation based scheme.

9. An apparatus for encoding a block-based communication system header, comprising:
    a block encoding unit for encoding cyclic prefix (CP) mode bits using a block code, wherein said CP mode bits define a time duration of a guard interval;
    a systematic Reed-Solomon (RS) encoder for encoding a physical (PHY) layer header and a medium access control (MAC) layer header to generate parity bits, wherein the PHY layer header includes at least the block coded CP mode bits;
    a vector splitter for dividing an output of the systematic RS encoder equally into first and second data blocks and appending a predefined number of tail bits to each data block, wherein the first data block includes at least the CP mode bits; and
    a mapper for mapping the first and second data blocks into at least two symbols, wherein the first data block is mapped to a first symbol, and wherein the first symbol is to be transmitted before the second symbol.

10. The apparatus of claim 9, wherein the CP mode bits are the first bits in the PHY layer header.

11. The apparatus of claim 9, wherein the block-based communication system header is at least a physical layer convergence protocol (PLCP) header.

12. The apparatus of claim 9, further comprising an encoder for encoding the at least first and second data blocks using at least a rate-1/2 convolutional code before the data blocks are mapped by the mapper.

* * * * *